June 24, 1930.  R. V. OWEN  1,766,528
AUTOMATIC ELECTRICAL SWITCH
Filed March 1, 1928
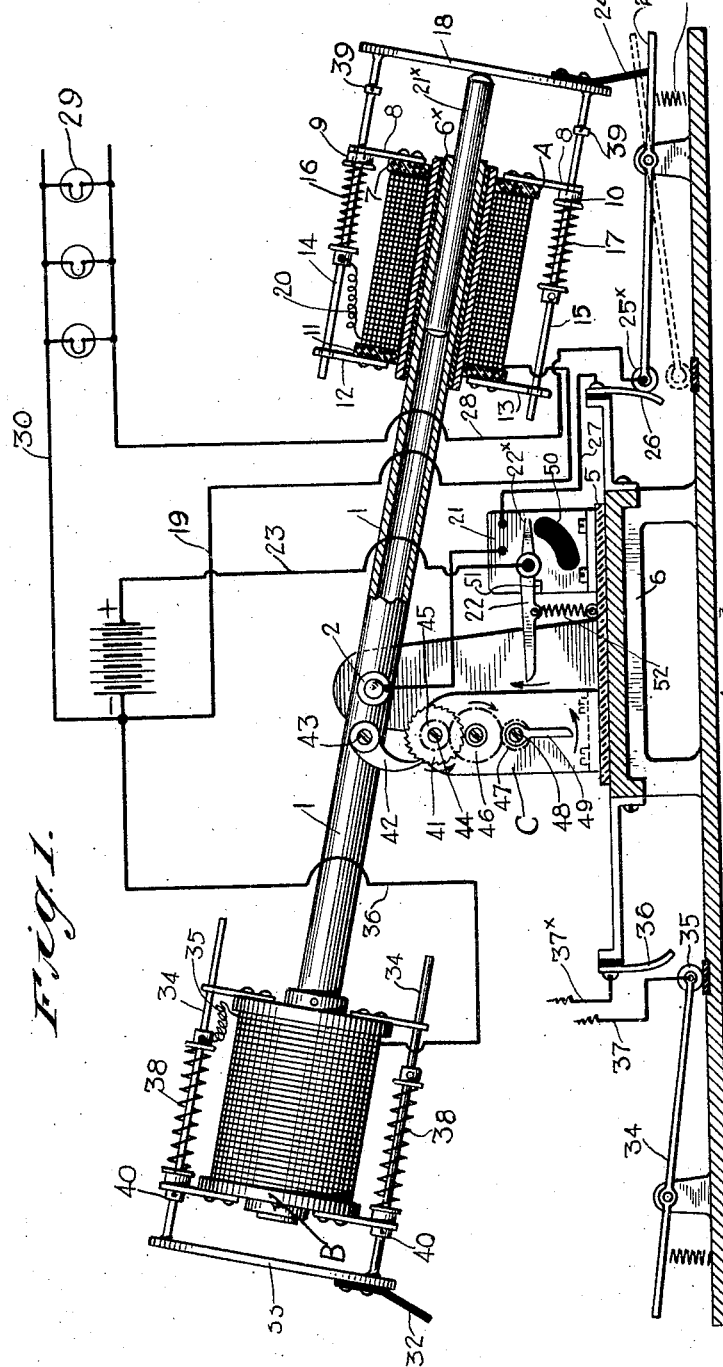
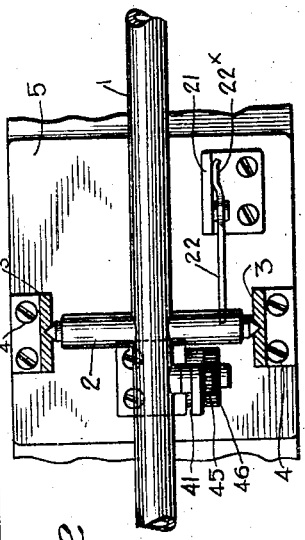
INVENTOR
Robert Vaughan Owen
BY H. Lee Helms
ATTORNEY Patented June 24, 1930

1,766,528

UNITED STATES PATENT OFFICE

ROBERT VAUGHAN OWEN, OF NEW YORK, N. Y.

AUTOMATIC ELECTRICAL SWITCH

Application filed March 1, 1928. Serial No. 258,387.

The object of the present invention is to provide an automatic electric switch of a type adapted for intermittent or flash electric signs.

The invention will be described with reference to the accompanying drawings in which—

Figure 1 is a side elevation, partly in section, of an embodiment of the invention;

Figure 2 is a fragmentary plan view of that part of the pivoted part of the magnet carrying tube and its connections with the timer.

In the embodiment illustrated in the drawings, two electromagnets A and B are carried at the ends of a rocking tube 1. Tube 1 is provided centrally of its length with a cross pivot member 2 which is pivoted intermediate the vertical supports 3. Vertical supports 3 are secured by screws 4 to an insulation plate 5, the latter being in turn secured to a suitable standard 6.

At its right hand end tube 1 has secured thereto over insulation sheath 6$^\times$ the electromagnet A. Front plate 7 of magnet A is provided with bracket arms 8 supporting an upper apertured boss 9 and a lower apertured boss 10. The rear disk plate 11 of the magnet carries an upper bracket 12 and the lower bracket 13. A rod 14 passes through boss 9 and through an aperture in bracket 12, and a rod 15 passes through boss 10 and through an aperture formed in the bracket 13. Connected to the upper rod is a spring 16, which spring is also connected to boss 9 and connected to rod 15 is a spring 17 which is connected also to boss 10.

Carried by rods 14, 15 is an iron disk 18 adapted to be acted upon by the magnet and drawn toward the latter against the tension of springs 16 and 17.

A lead wire 19 from the negative terminal of the battery is connected to the coil of magnet A and the coil is also connected by wire 20 with rod 14. The circuit through the coil continues from rod 14 to disk plate 18, through a slide weight 21$^\times$ (when the latter is in contact with the disk), and via slide weight 21$^\times$ to tube 1, from tube 1 to a switch plate 21 and thence via switch 22 and wire 23 to the positive side of the battery. Thus the parts as shown in the drawings are in such position that the magnet is at the instant of acting upon disk plate 18 to cause the latter to sharply move to the left and thereby throw slide weight 21$^\times$ toward the opposite end of tube 1. Preliminary to such action of the magnet an insulated finger 24 has through engagement with pivoted switch arm 25 thrown the roll-end 25$^\times$ of the latter into contact with a spring switch member 26. Through wire 27 connected to switch plate 21, spring switch member 26 leads current from the positive side of the battery through switch element 25$^\times$, through wire 28 and to the bank of lights 29, the latter being connected by wire 30 with the positive side of the battery.

As soon as magnet A throws its magnetic force upon disk plate 18 and the latter by impact upon slide weight 21$^\times$ throws the weight to the left, the circuit through the magnet will be broken and the weight will pass beyond the pivotal point 2 and will overbalance that end of the tube causing the latter with magnet B to drop downwardly. Such movement will carry finger 24 out of contact with pivoted switch arm 25 and a spring 31 will retract switch member 25$^\times$ from spring switch member 26 and the circuit will be broken through the lamps 29. In its continued movement downwardly, the left hand end of tube 1 will carry a finger 32 on disk plate 33 into contact with a pivoted switch arm 34 having a roll switch element 35 and the latter will come into contact with a spring switch member 36 by means of wires 37, 37$^\times$. Switch members 35 and 36 are adapted to carry current from the battery through the bank lights 29, the connections being the same as those illustrated at the right hand end of the drawing with respect to magnet A and, therefore, not being shown in detail. When slide weight 21$^\times$ moves to the extreme left in position, it comes into contact with disk plate 33 and current from the positive side of the battery is carried via tube 1, the weight, disk plate 33, rod 34 and wire 35 to the coil of magnet B and thence through wire 36 to the negative side of the battery completing a circuit. The magnet will thereupon cause a quick motion of plate 33 to the right, causing impact upon slide weight 21ˣ and the movement thereof to the right and to the position shown in the drawings. The elements of magnet B are shown in the drawings in their position immediately prior to the return to initial position of plate 33 under the influence of springs 38 after action on the plate by the magnet B.

The length of movement of the disk plates 18, 33 may be regulated by adjusting stop members 39 on rods 14, 15, and corresponding stop members 40 on rods 34.

The invention comprises automatic means for shutting off the device after a predetermined time interval, such means comprising a standard C on which is mounted for rotation a ratchet wheel 41 in mesh with a pawl 42 pivoted at 43 upon tube 1. The shaft 44 upon which ratchet wheel 41 is mounted carries a pinion 45 in mesh with a reducing gear 46 which in turn is in mesh with a gear 47 on a shaft 48 carrying a finger 49. The means just described comprises conventional form of reducing gear, and it will be seen that after a certain number of revolutions of ratchet wheel 41, arm 49 will be brought into contact with the left hand end of switch arm 22 and the arm will be swung in the direction of the arrow, Figure 1, causing its end 22ˣ to move from effective contact plate 21 and to be carried upon insulation block 50, thus breaking the circuit from the battery causing the device to stop. In its effective position switch arm 22 rests upon a stop 51 being held in that position by light spring 52, and the action of finger 49 upon the switch arm is in opposition to the spring.

The tension of the spring 16, 17 on the one hand and 38 on the other hand may be so regulated proportionately to the magnets and the weight 21ˣ that the latter will be thrown by each magnet beyond the dead center of the tube 1 so that the latter will move downwardly under the gravitational influence of the weight and the weight will thereafter slide down into contact with the disk plate 18 or 33 as the case may be, the gravitational effect of the weight upon that end of the tube being continued until the switch arm 25 or 34 is actuated.

Having described my invention, what I claim and desire to secure by Letters Patent is as follows:—

1. An automatic timing switch, comprising a pivoted rocking member, a weight carried by and movable relatively to said rocking member, opposed magnets carried by the rocking member, one magnet at each end thereof, and members actuated by said magnets for acting upon the weight to move the same toward and from the opposite ends of the rocking member.

2. An automatic timing switch comprising a pivoted tube, a weight within the tube, a magnet at each end of the tube, a spring engaged magnetic plate at the end of each tube, and movable toward the magnet by magnetic attraction and away from the magnet by its spring connection, a circuit through the magnet which includes said weight and magnet plate and a circuit closing member mechanically acted upon by the rocking tube.

In testimony whereof, I have signed my name to this specification,

ROBERT VAUGHAN OWEN.